(12) United States Patent  
Harjani et al.

(10) Patent No.: US 8,098,707 B2  
(45) Date of Patent: Jan. 17, 2012

(54) ULTRA WIDEBAND RECEIVER

(75) Inventors: Ramesh Harjani, Minneapolis, MN (US); Byung-Hoo Jung, West Lafayette, IN (US); Mi Kyung Oh, Daejeon (KR)

(73) Assignee: Regents of the University of Minnesota, St. Paul, MN (US)

( * ) Notice: Subject to any disclaimer, the term of this patent is extended or adjusted under 35 U.S.C. 154(b) by 1166 days.

(21) Appl. No.: 11/669,938

(22) Filed: Jan. 31, 2007

(65) Prior Publication Data

US 2007/0242735 A1    Oct. 18, 2007

Related U.S. Application Data

(60) Provisional application No. 60/743,198, filed on Jan. 31, 2006.

(51) Int. Cl.  
*H04B 1/00*    (2006.01)

(52) U.S. Cl. .......................... 375/130; 375/340

(58) Field of Classification Search ............. 375/130, 375/138, 140, 147, 340  
See application file for complete search history.

(56) References Cited

U.S. PATENT DOCUMENTS

| | | |
|---|---|---|
| 2,671,896 A | 3/1954 | De Rosa |
| 3,587,107 A | 6/1971 | Ross |
| 3,612,899 A | 10/1971 | Ross et al. |
| 3,662,316 A | 5/1972 | Robbins |
| 3,668,639 A | 6/1972 | Harmuth |
| 3,678,204 A | 7/1972 | Harmuth |
| 3,705,981 A | 12/1972 | Harmuth |
| 3,728,632 A | 4/1973 | Ross |
| 3,739,392 A | 6/1973 | Ross |
| 3,772,697 A | 11/1973 | Ross |
| 3,806,795 A | 4/1974 | Morey |
| 3,878,749 A | 4/1975 | Woron |
| 3,934,252 A | 1/1976 | Ross |
| 4,008,469 A | 2/1977 | Chapman |
| 4,017,854 A | 4/1977 | Ross |
| 4,072,942 A | 2/1978 | Alongi |
| 4,099,118 A | 7/1978 | Franklin et al. |
| 4,152,701 A | 5/1979 | Mara et al. |
| 4,254,418 A | 3/1981 | Cronson et al. |
| 4,344,705 A | 8/1982 | Kompa et al. |
| 4,641,317 A | 2/1987 | Fullerton |
| 4,651,152 A | 3/1987 | Harmuth |
| 4,688,041 A | 8/1987 | Cronson et al. |
| 4,695,752 A | 9/1987 | Ross et al. |
| 4,743,906 A | 5/1988 | Fullerton |
| 4,751,515 A | 6/1988 | Corum |
| 4,813,057 A | 3/1989 | Fullerton |

(Continued)

OTHER PUBLICATIONS

Lovelace, W. M., et al., "The Effects of Timing Jitter and Tracking on the Performance of Impulse Radio", *IEEE Journal on Selected Areas in Communication*, 20(9), (2003), 1646-1651.

(Continued)

*Primary Examiner* — David Lugo  
(74) *Attorney, Agent, or Firm* — Schwegman, Lundberg & Woessner P.A.

(57) ABSTRACT

An ultra-wideband (UWB) receiver utilizing an $X^n (n>1)$ device as a signal detector for short pulse(s), impulse(s) or ultra-wideband signal(s). The transmitted signal comes to antenna and passes through a band pass filter (BPF). The signal is fed into an $X^n$ device. The output signal from the $X^n$ device is fed into integration/dump block. The output from the integration/dump block is fed into decision block.

16 Claims, 13 Drawing Sheets

U.S. PATENT DOCUMENTS

| | | |
|---|---|---|
| 4,862,174 A | 8/1989 | Naito et al. |
| 4,907,001 A | 3/1990 | Harmuth |
| 4,979,186 A | 12/1990 | Fullerton |
| 5,057,846 A | 10/1991 | Harmuth |
| 5,095,312 A | 3/1992 | Jehle et al. |
| 5,134,408 A | 7/1992 | Harmuth |
| 5,146,616 A | 9/1992 | Tang et al. |
| 5,148,174 A | 9/1992 | Harmuth |
| 5,148,175 A | 9/1992 | Woolfolk |
| 5,153,595 A | 10/1992 | Harmuth |
| 5,159,343 A | 10/1992 | Harmuth |
| 5,177,486 A | 1/1993 | Kim et al. |
| 5,216,429 A | 6/1993 | Nakagawa et al. |
| 5,216,695 A | 6/1993 | Ross et al. |
| 5,223,838 A | 6/1993 | Tang et al. |
| 5,227,621 A | 7/1993 | Kim et al. |
| 5,239,309 A | 8/1993 | Tang et al. |
| 5,248,975 A | 9/1993 | Schutz |
| 5,274,271 A | 12/1993 | McEwan |
| 5,307,079 A | 4/1994 | Ross et al. |
| 5,307,081 A | 4/1994 | Harmuth |
| 5,313,056 A | 5/1994 | Kim et al. |
| 5,319,218 A | 6/1994 | Kim et al. |
| 5,323,169 A | 6/1994 | Koslover |
| 5,332,938 A | 7/1994 | McEwan |
| 5,337,054 A | 8/1994 | Ross et al. |
| 5,345,471 A | 9/1994 | McEwan |
| 5,351,053 A | 9/1994 | Wicks et al. |
| 5,361,070 A | 11/1994 | McEwan |
| 5,363,108 A | 11/1994 | Fullerton |
| 5,365,240 A | 11/1994 | Harmuth |
| 5,381,151 A | 1/1995 | Boles et al. |
| 5,422,607 A | 6/1995 | McEwan |
| 5,455,593 A | 10/1995 | Ross |
| 5,457,394 A | 10/1995 | McEwan |
| 5,465,094 A | 11/1995 | McEwan |
| 5,471,162 A | 11/1995 | McEwan |
| 5,479,120 A | 12/1995 | McEwan |
| 5,486,833 A | 1/1996 | Barrett |
| 5,493,691 A | 2/1996 | Barrett |
| 5,510,800 A | 4/1996 | McEwan |
| 5,512,834 A | 4/1996 | McEwan |
| 5,517,198 A | 5/1996 | McEwan |
| 5,519,342 A | 5/1996 | McEwan |
| 5,519,400 A | 5/1996 | McEwan |
| 5,521,600 A | 5/1996 | McEwan |
| 5,523,758 A | 6/1996 | Harmuth |
| 5,523,760 A | 6/1996 | McEwan |
| 5,543,799 A | 8/1996 | Heger |
| 5,563,605 A | 10/1996 | McEwan |
| 5,573,012 A | 11/1996 | McEwan |
| 5,576,627 A | 11/1996 | McEwan |
| 5,581,256 A | 12/1996 | McEwan |
| 5,586,145 A | 12/1996 | Morgan et al. |
| 5,589,838 A | 12/1996 | McEwan |
| 5,592,177 A | 1/1997 | Barrett |
| 5,602,964 A | 2/1997 | Barrett |
| 5,609,059 A | 3/1997 | McEwan |
| 5,610,611 A | 3/1997 | McEwan |
| 5,610,907 A | 3/1997 | Barrett |
| 5,630,216 A | 5/1997 | McEwan |
| 5,661,385 A | 8/1997 | McEwan |
| 5,661,490 A | 8/1997 | McEwan |
| 5,673,050 A | 9/1997 | Moussally et al. |
| 5,677,927 A | 10/1997 | Fullerton et al. |
| 5,682,164 A | 10/1997 | McEwan |
| 5,687,169 A | 11/1997 | Fullerton |
| 5,748,891 A | 5/1998 | Fleming et al. |
| 5,901,172 A | 5/1999 | Fontana et al. |
| 6,002,708 A | 12/1999 | Fleming et al. |
| 6,810,087 B2 * | 10/2004 | Hoctor et al. ................. 375/259 |
| 2004/0029609 A1 * | 2/2004 | Li ............................. 455/550.1 |
| 2004/0235499 A1 * | 11/2004 | Tanaka et al. .............. 455/456.5 |
| 2004/0247062 A1 * | 12/2004 | Dimsdle ...................... 375/350 |
| 2005/0175076 A1 * | 8/2005 | Miller et al. .................. 375/150 |
| 2005/0206446 A1 * | 9/2005 | Shimazaki et al. ........... 329/313 |
| 2006/0126768 A1 * | 6/2006 | Constantinidis et al. ..... 375/350 |
| 2007/0096873 A1 * | 5/2007 | Sadr ............................ 340/5.61 |

OTHER PUBLICATIONS

Oh, M.-K., et al., "A New Noncoherent UWB Impulse Radio Receiver", *IEEE Communications Letters*, 9(2), (2005), 151-153.

Rowe, D., et al., "A Si/SiGe HBT Timing Generator IC for High-Bandwidth Impulse Radio Applications", *Proceedings of the IEEE 1999 Custom Integrated Circuits Conference*, (1999), 221-224.

Zhuang, W., et al., "Ultra-wideband wireless communications", *Wireless Communications and Mobile Computing*, 3, (2003), 663-685.

\* cited by examiner

Vdd: Power supply voltage
R: Load resistor
M1 ~ M2: nMOS transistors
X: Input
O: Output

ULTRA WIDEBAND RECEIVER

RELATED APPLICATION

This application claims priority to U.S. Provisional Application Ser. No. 60/743,198 (entitled NON-COHERENT ULTRA WIDEBAND RECEIVER, filed Jan. 31, 2006), which application is incorporated herein by reference for all purposes.

FIELD

The embodiments relate generally to data transmission and reception and more particularly to a non-coherent ultra wideband receiver.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright © 2005-2007, Regents of the University of Minnesota.

SUMMARY

An ultra-wideband (UWB) receiver utilizing $X^1(n>1)$ device as a signal detector for short pulse(s), impulse(s) or ultra-wideband signal(s). The transmitted signal comes to antenna and pass through band pass filter (BPF). And the signal is fed into $X''(n>1)$ device. The output signal from the $X''(n>1)$ device is fed into integration/dump block. The output from the integration/dump block is fed into decision block. Single or multiple short pulse(s), impulse(s) or ultra-wideband signal(s) represent a data. The transmitted short pulse(s), impulse(s) or ultra-wideband signal(s) representing a data is (are) confined in a fixed time period (Tb). The integration time (Tin) for the integration/dump block may be equal to or smaller than Tb, and greater than or equal to each pulse, impulse or ultra-wideband signal duration time.

Some embodiments use a non-coherent type receiver that makes the system simple and easy to implement. Some embodiments use an $X''(n>1)$ device. For example a simple multiplier can be used as a X2 device. A simple comparator can be used as a decision making device for the receiver in some embodiments. But another embodiment of this invention uses integration/dump block to further improve the decision accuracy and provide system versatility. Another feature of some embodiments is the use of a short integration time as described below to implement receiver performance.

DETAILED DESCRIPTION

In the following detailed description, reference is made to the accompanying drawings that form a part hereof, and in which is shown by way of illustration, specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims of the invention.

In the Figures, the same reference number is used throughout to refer to an identical component which appears in multiple Figures. Signals and connections may be referred to by the same reference number or label, and the actual meaning will be clear from its use in the context of the description.

The functions or algorithms described herein are implemented in hardware, and/or software in embodiments. The software comprises computer executable instructions stored on computer readable media such as memory or other types of storage devices. The term "computer readable media" is also used to represent software-transmitted carrier waves. Further, such functions correspond to modules, which are software, hardware, firmware, or any combination thereof Multiple functions are performed in one or more modules as desired, and the embodiments described are merely examples. A digital signal processor, ASIC, microprocessor, or any other type of processor operating on a system, such as a personal computer, server, a router, or any other device capable of processing data including network interconnection devices executes the software.

A block or module as described below may be implemented as logic, circuitry, or software that implements the functionality described for the block Some embodiments implement functions in two or more specific interconnected hardware modules or devices with related control and data signals communicated between and through the modules, or as portions of an application-specific integrated circuit. Thus, the example process flow is applicable to software, firmware, and hardware implementations.

Figure 1A:
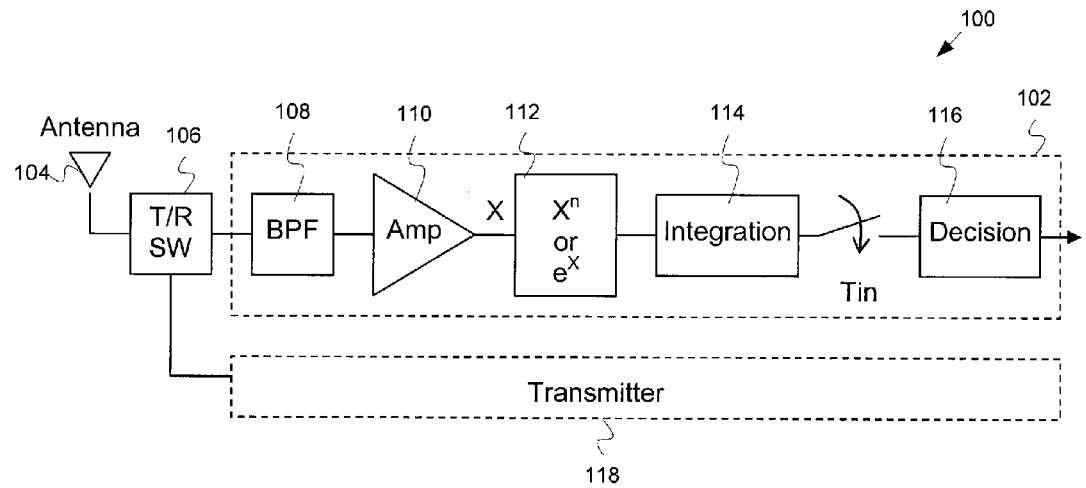
FIGS. 1A and 1B show pulse, impulse or ultra-wide-band signal receiver architectures according to embodiments of the invention.
Figure 1B:
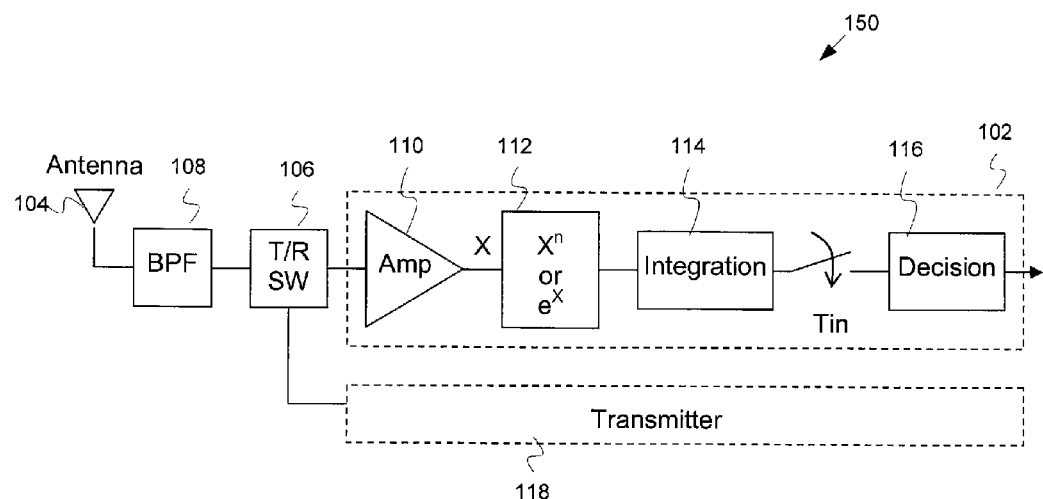

FIGS. 1A and 1B show pulse, impulse or ultra-wide-band signal receiver architectures 100 and 150 according to embodiments of the invention. In some embodiments a receiver 102 has band pass filter (BPF) 108 that passes signal spectrum. In particular embodiments, the BPF 108 may be further optimized by making the magnitude response of the filter to be similar with that of the power spectrum density of the incoming signal in the frequency domain. The BPF 108 can be located before (FIG. 1B) or after (FIG. 1A) a Transmit/Receive Switch ("T/R SW") block 106. The T/R SW block 106 may be omitted for frequency division (or hopping) multiplexing embodiments.

After passing the BPF 108, the signal may be passed through an optional amplifier block 110. In some embodiments, the amplifier block 110 may be integrated with a following $X^n$ or $e^X$ block 112 (also referred to as a multiplier block). The signal passes through $X^n$ (in some embodiments, n=2,4,6, . . . ) or $e^X$ block 112.

An $X^n$ block 112 is a device that receives an input and provides an output such that when the input is X, the output is approximately $\sim AX^n$ where n=2,4,6, . . . and A is constant.

An $e^X$ block 112 is a device that receives an input and provides an output such that when the input is X, the output is approximately $\sim Be^X$, where B is constant.

The signal is then passed into a integration and dump block 114. An integration and dump block integrates the input signal for a certain time period ($T_{in}$) and dumps (sends) the integrated results to the following block. A decision block 116 receives the signal from integration and dump block 114 and makes decision as to whether the data is 0 or 1 using the dumped signals from the previous block.

Transmitter 118 may optionally be used to provide for bi-directional communications with other wireless devices.

Figure 2A:
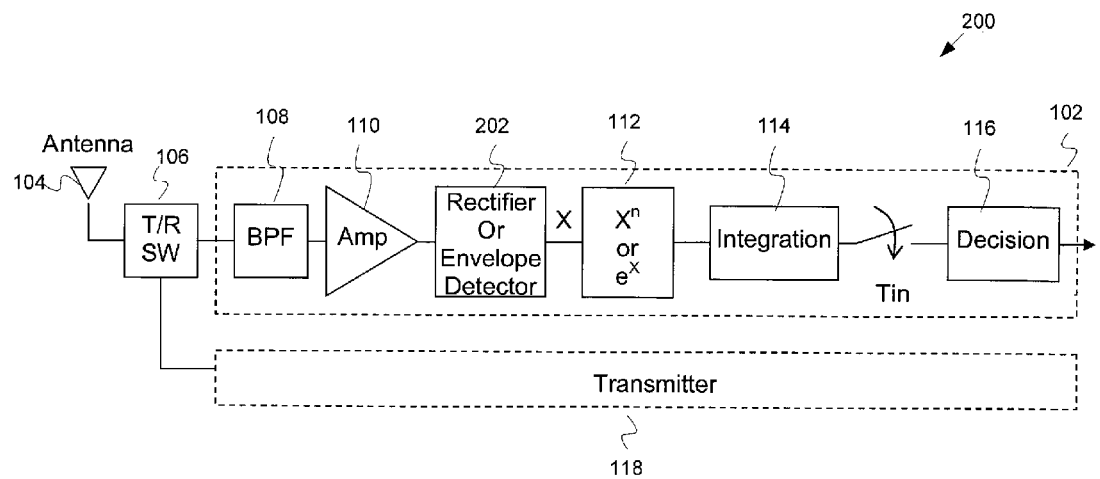
FIGS. 2A and 2B show pulse, impulse or ultra-wide-band signal receiver architectures according to alternative embodiments of the invention.
Figure 2B:
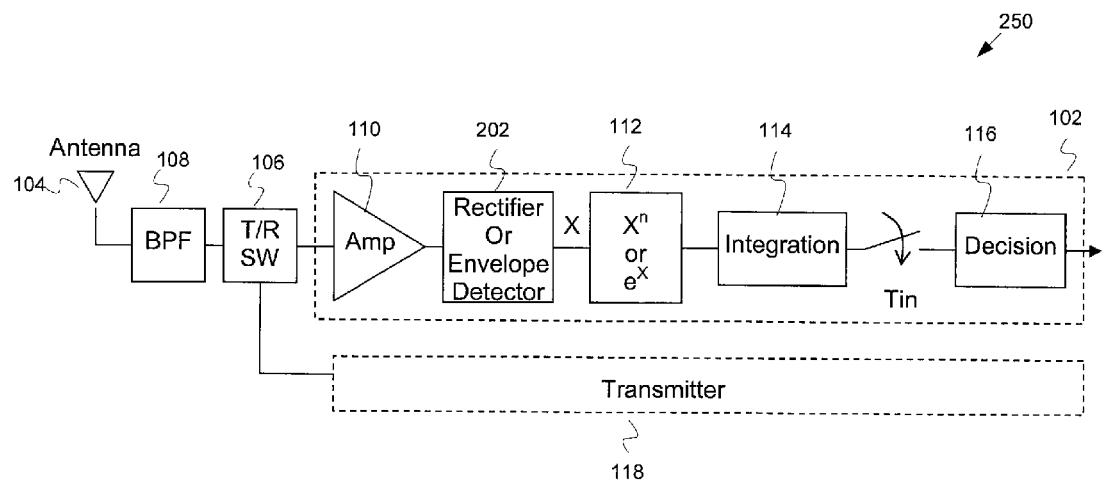

FIGS. 2A and 2B show signal receiver architectures according to alternative embodiments of the invention. The receiver may be a pulse, impulse or ultra-wide-band signal receiver architecture. In general, the receiver architectures 200 and 250 illustrated in FIGS. 2A and 2B respectively are similar to the architecture illustrated in FIGS. 1A and 1B. Receiver architectures 200 and 250 include a rectifier or envelope detector 202 inserted at the front of the $X^n$ or $e^X$ block 112. In varying embodiments, the amplifier and rectifier (or envelope detector) location may be switched. Further, the amplifier 110 may be combined with rectifier (or envelope detector) 202 or $X^n$ (or $e^X$) block 112. In these embodiments, n can be any number bigger than 1.

Figure 3A:
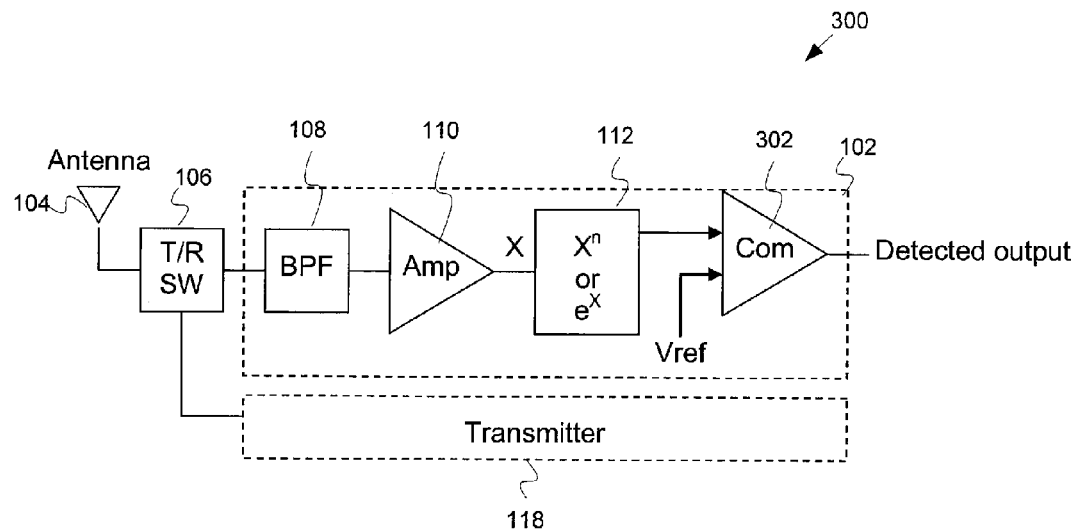
FIGS. 3A and 3B show pulse, impulse or ultra-wide-band signal receiver architectures according to further alternative embodiments of the invention.
Figure 3B:
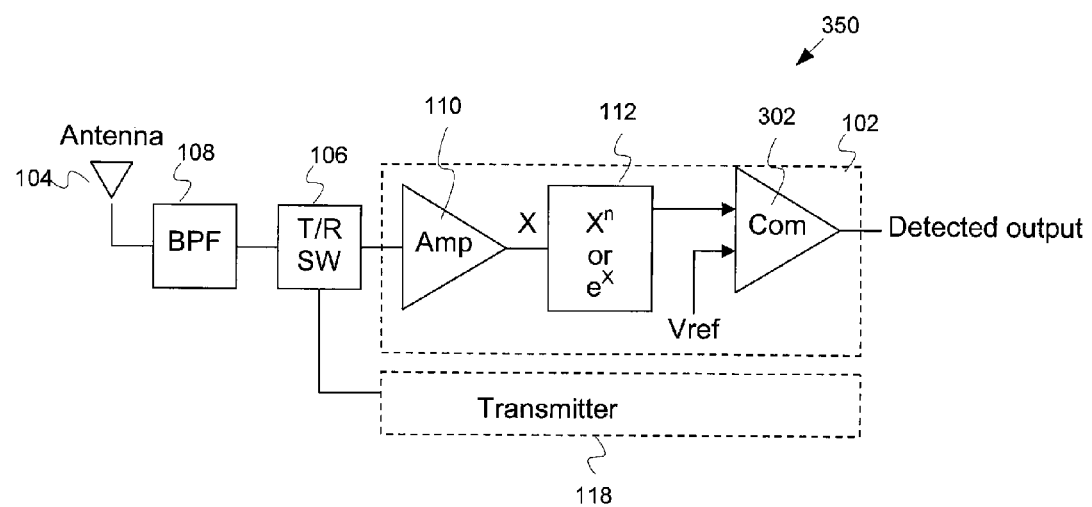

FIGS. 3A and 3B show pulse, impulse or ultra-wide-band signal receiver architectures 300 and 350 according to further alternative embodiments of the invention. In general, the receiver architectures 300 and 350 illustrated in FIGS. 3A and 3B are similar to those illustrated in FIGS. 1A and 1B. In architectures 300 and 350, a comparator 302 is used instead of integration/dump block 114. The comparator 302 compares the output from $X^n$ (or $e^X$) block 112 with a reference voltage Vref, and generates a detected output signal. In this embodiment n can be any number bigger than 1.

Figure 4A:
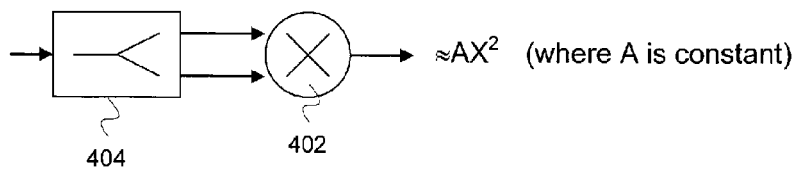
FIGS. 4A and 4B provided further details of an $X''$ block used in some embodiments of the invention.
Figure 4B:
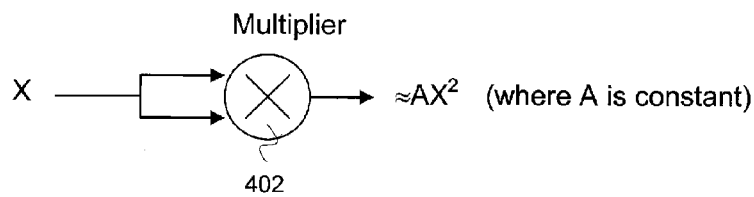

FIGS. 4A and 4B provided further details of an $X^n$ block 112 used in some embodiments of the invention. In some embodiments, the $X^n$ block 112 is an $X^2$ device. FIG. 4A shows one example of an $X^2$ block. A signal divider 404 splits the input signal and the multiplier 402 multiplies the divided signals. Instead of using a signal divider, the signal can be directly connected to both of the two inputs of a multiplier as illustrated in FIG. 4B.

Figure 5:
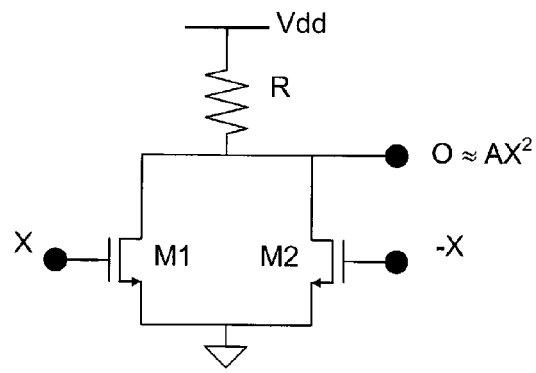
FIG. 5 shows an example multiplier circuit designed using CMOS technology that may be used in some embodiments.

FIG. 5 shows an example multiplier circuit designed using CMOS technology that may be used in some embodiments. In some embodiments, M1 and M2 may be nMOS transistors.

The output from the multiplier ($X^2$) can be multiplied with the input signal (X) again to get $X^3$. The $X^2$ device can be cascaded to get higher order outputs ($X^4$, $X^6$, . . . ). Further, it should be noted that The $X^n$ device and $e^X$ device can be combined in any sequence to get higher order outputs.

Figure 6A:
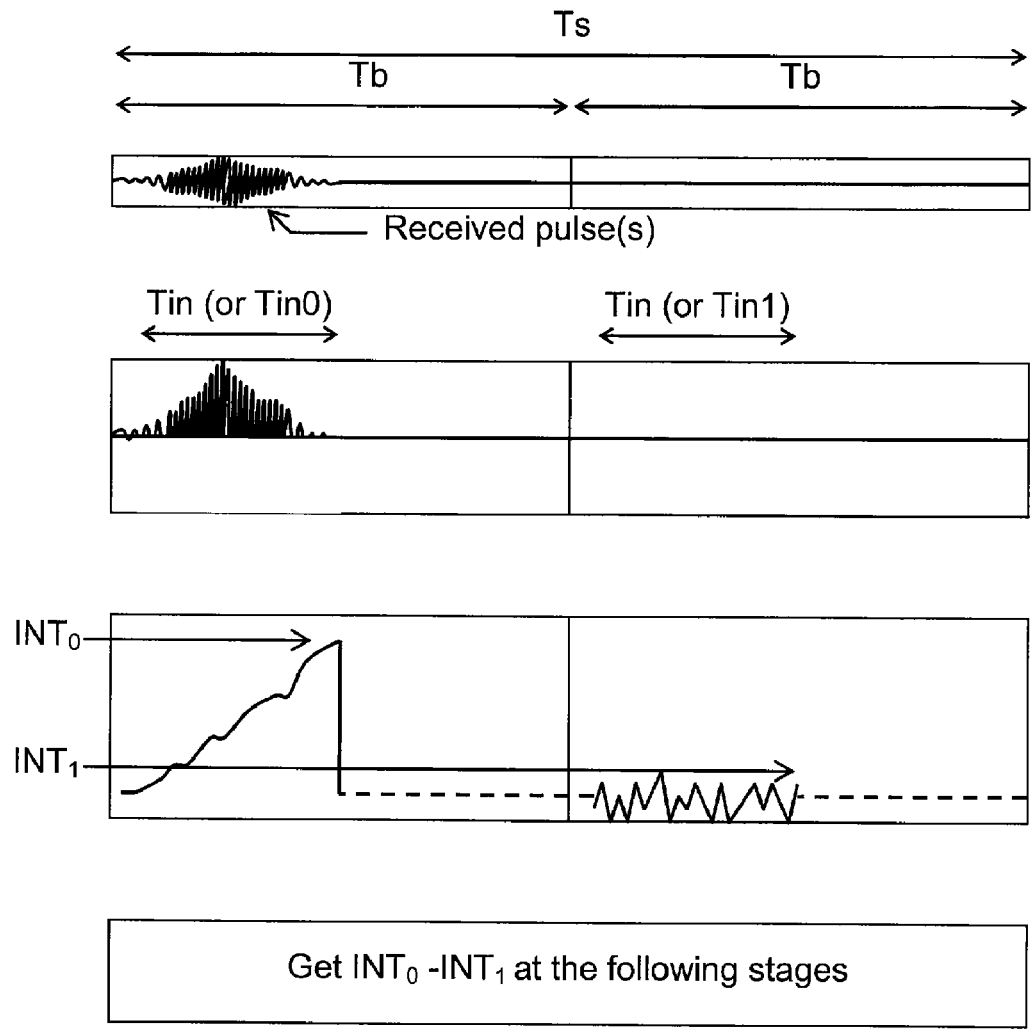
FIGS. 6A and 6B show example signal timing diagrams for a binary PPM (pulse position modulation) case FIGS. 7A and 7B provide further details of example dump switch and decision blocks according to embodiments of the invention.
Figure 6B:
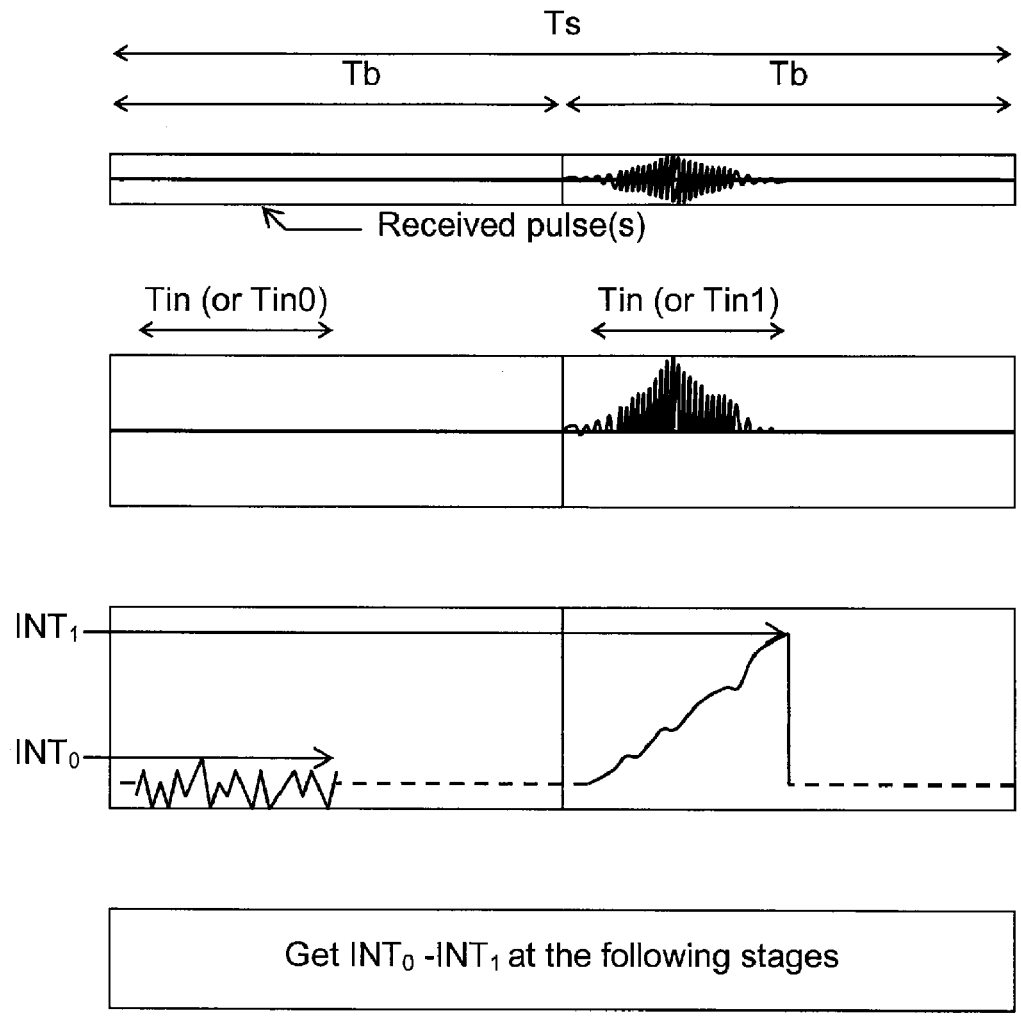

FIGS. 6A and 6B show example signal timing diagrams for a binary PPM (pulse position modulation) case. In this PPM example, the symbol time (Ts) is divided by two. When the pulse(s) is located in the left half (Tb), the pulse represents a binary 0. When the pulse(s) is located in the right half (Tb), the pulse represents a binary 1. After passing $X^n$ or $e^X$ block 112, the signal is integrated for time interval Tin. In some embodiments, Tin may be equal to Tb or smaller than Tb. The integrated values for the left half ($INT_0$) and the right half ($INT_0$) are sent to the following stage. The following stage subtracts them and determines whether the pulse represents a 1 or 0. The example illustrated in FIGS. 6A and 6B show binary PPM (pulse position modulation) case, but in varying embodiments the modulation can be PPM, PAM (pulse amplitude modulation) or OOK (on off keying). Further, in the interest of clarity and brevity, the example has only one bit per symbol. Those of skill in the art will appreciate that there can be any number of bits per symbol (M-ary system) and within the scope of the inventive subject matter. Still further, the example illustrated in FIGS. 6A and 6B shows a single pulse per binary time. Those of skill in the art will appreciate that multiple pulses per binary (or M-Ary) time is possible and within the scope of the inventive subject matter.

Figure 7A:
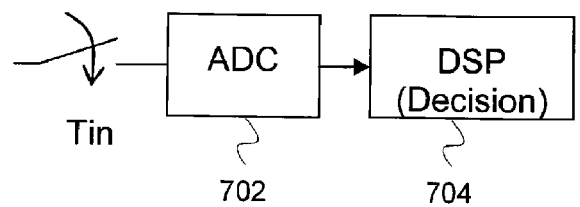
Figure 7B:
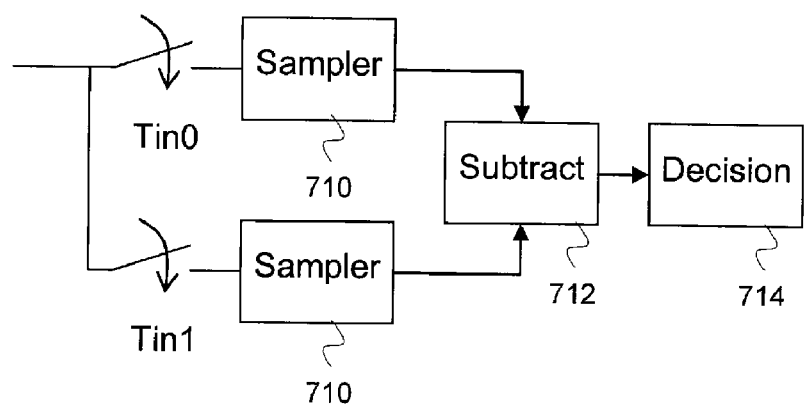

FIGS. 7A and 7B provide further details of example dump switch and decision blocks according to embodiments of the invention. In FIG. 7A, an ADC 702 converts the dumped signals into digital signals, and the digital signal-processing block 704 makes decision based on the dumped and AD converted signals.

In FIG. 7B, the left half (Tin0) integrated signal (INT0) and the right half (Tin1) integrated signal (INT1) are sampled separately by samplers 710 and subtracted at the following stage 712 to make decision 714.

Figure 8A:
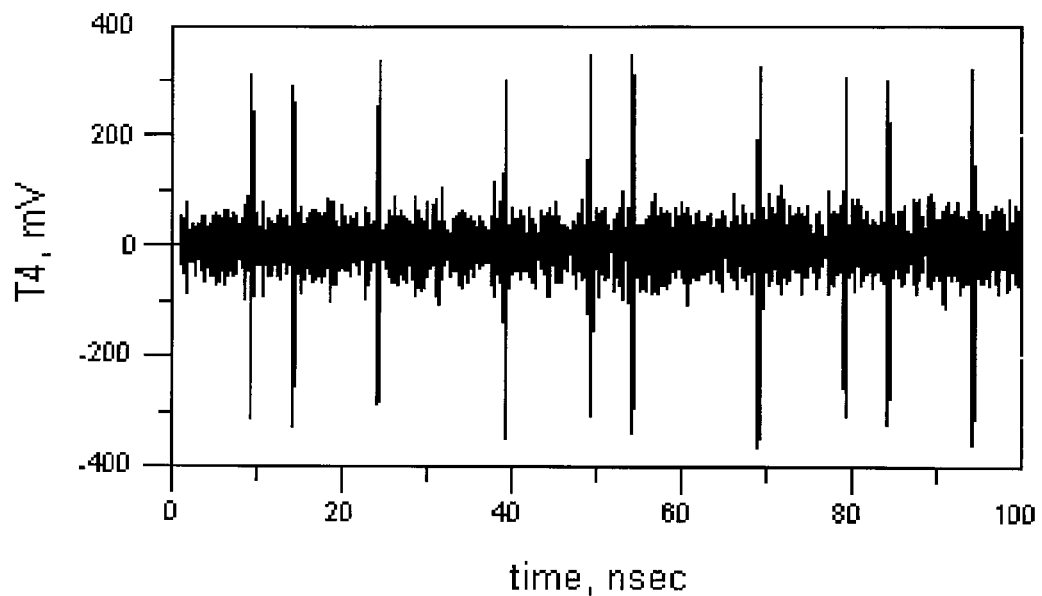
FIGS. 8A-8D show a simulation example of signals at various stages of the operation of receiver architectures according to embodiments of the invention.
Figure 8B:
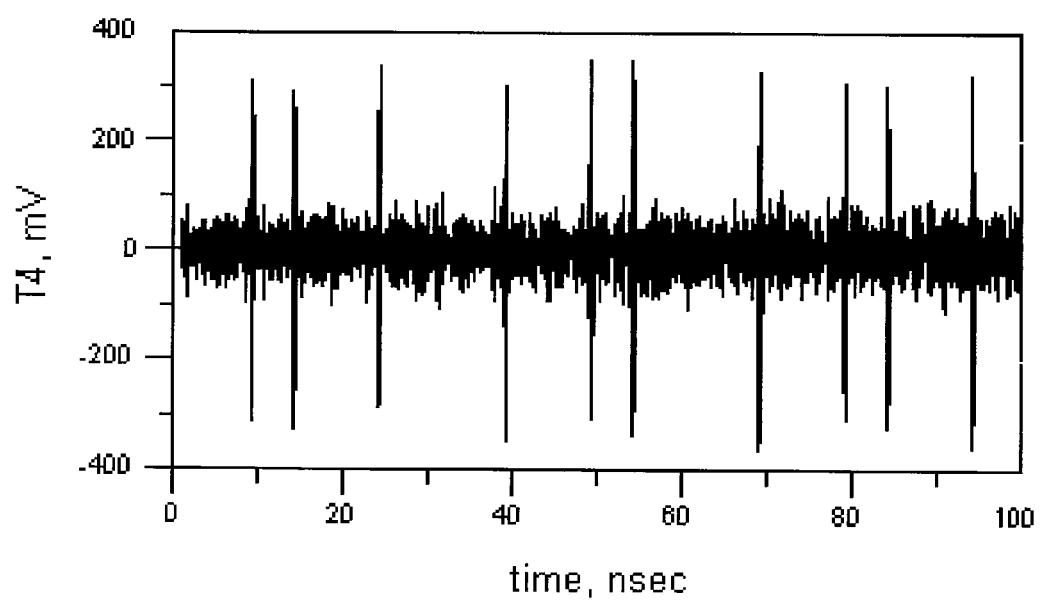
Figure 8C:
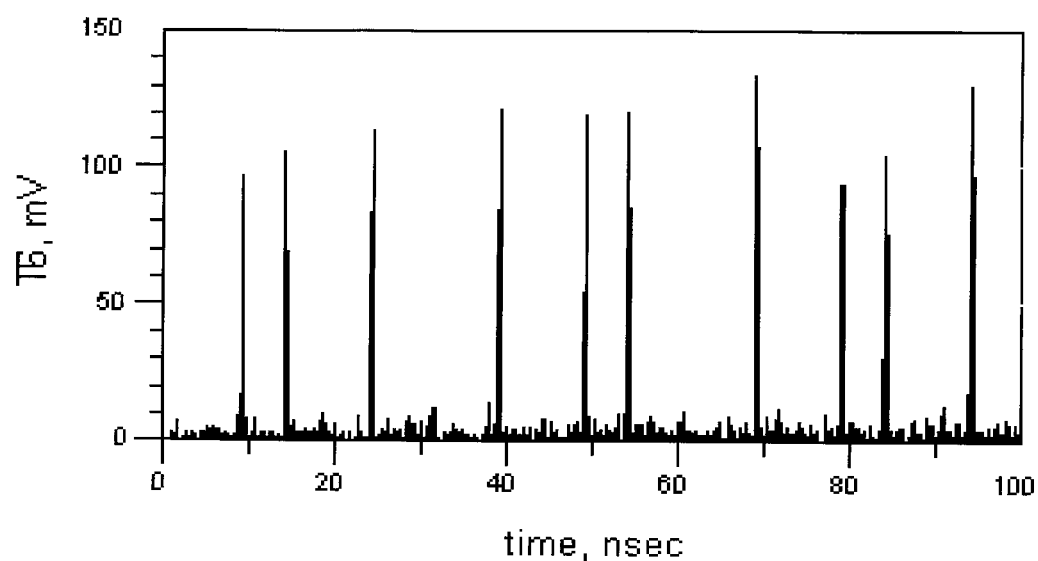
Figure 8D:
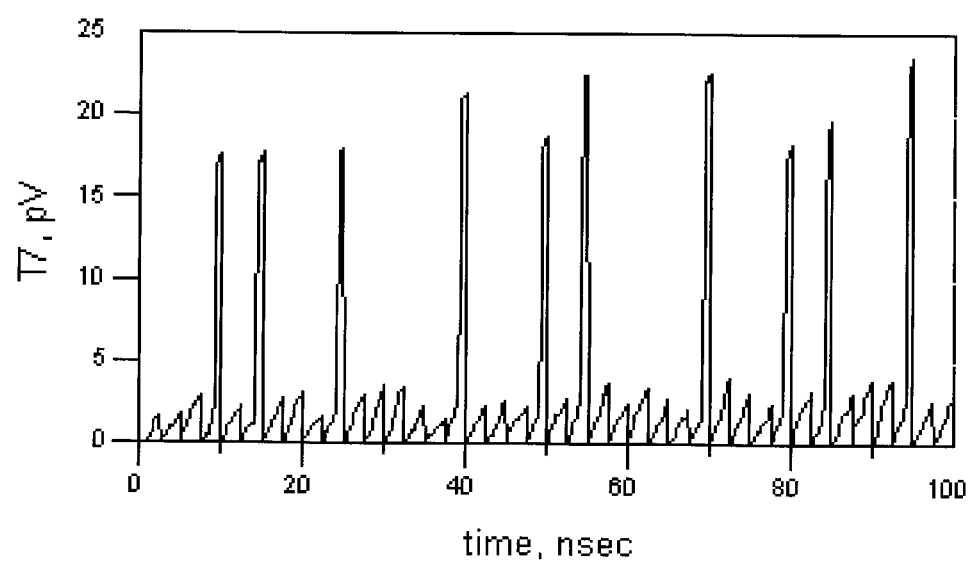

FIGS. 8A-8D show a simulation example of signals at various stages of the operation of the above-described architectures. FIG. 8A shows an example input signal to the receiver 102 that has pulse position modulated signal and noise. FIG. 8B shows the signal after passing BPF 108. Any kind of BPF 108 may be used. In some embodiments, a BPF whose magnitude response is close to that of the power spectrum density of an input signal is desirable and may improve the system performance. FIG. 8C shows the signal after passing an $X^2$ block 112. The example signal becomes peakier and this peaky signal may improve the receiver performance. FIG. 8D shows the example signal at the integration and dump block 114. In the example shown, the integration time (Tin) is half of the binary time (Tb). The dumped signal is sent to ADC 702, and the left half integrated signal (INT0) and the right half integrated signal (INT1) are subtracted (INT0-INT1).

Figure 9:
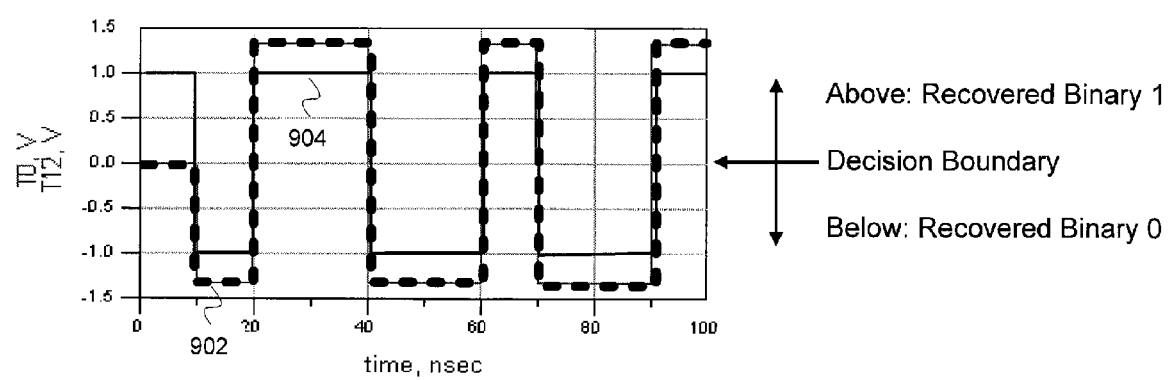
FIG. 9 illustrates a signal decision boundary for transmitted and received signals.

FIG. 9 illustrates a signal decision boundary for transmitted and received signals. The decision boundary is 0. If "INT0-INT1" is above the decision boundary the recovered data is 1. If "INT0-INT1" is below the decision boundary the recovered data is 0. In FIG. 9, the dashed line 902 is the data sent at the transmitter side, and solid line 904 is the data recovered at the receiver side.

Figure 10A:
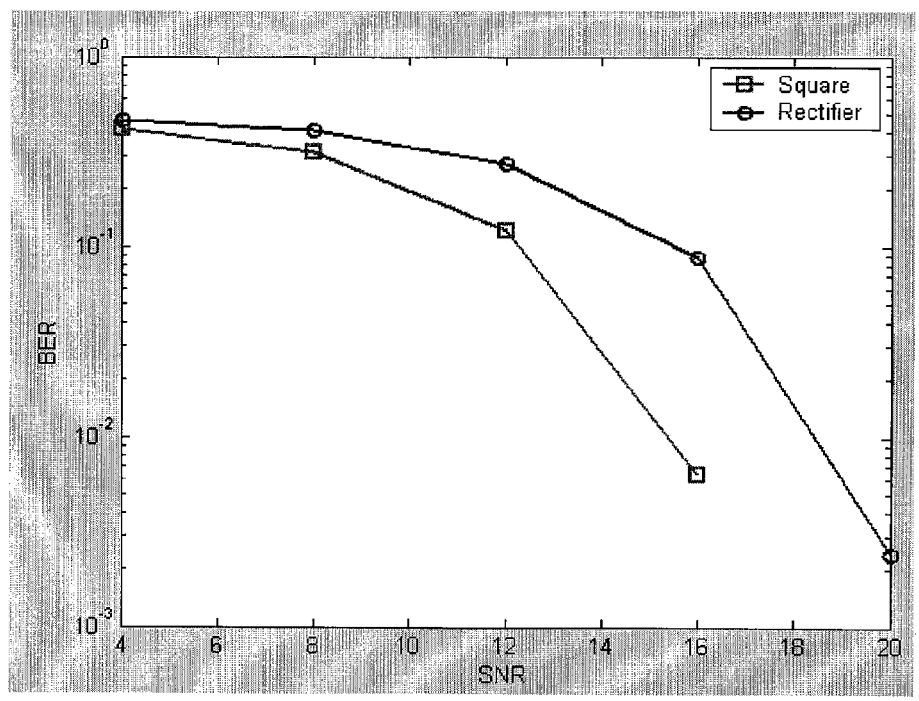
FIGS. 10A-10D shows a BER (bit error rate) for the simulation results according to a particular embodiment.

FIGS. 10A-10D shows a BER (bit error rate) for the simulation results according to a particular embodiment. FIG. 10A compares the performance of a simple rectifier based non-coherent detector and that of the $X^n$ block based non-coherent receiver 102 ($X^2$ case). The X-axis is SNR (signal to noise ratio) and Y-axis is BER (bit error rate). For a given SNR, the receiver 102 of a particular embodiment shows a better BER.

Figure 10B:
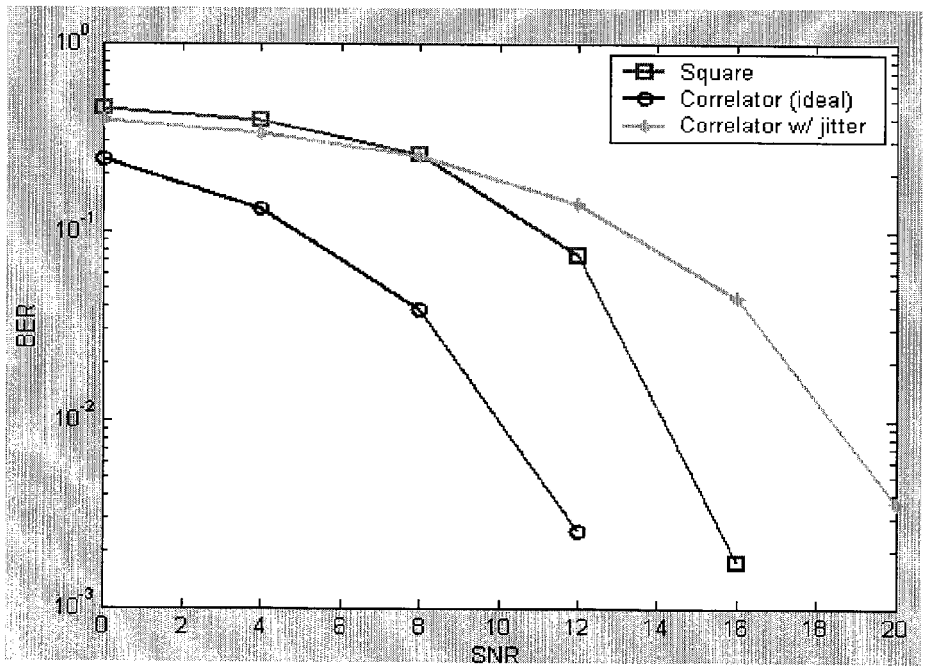

FIG. 10B compares the performance of a coherent detector and that of the novel $X^n$ block based non-coherent receiver ($X^2$ case) that has a typical BPF and integration time (Tin) equal to binary time (Tb) according to a particular embodiment. In a typical coherent receiver, the input signal is multiplied with a template signal. When the template signal is ideal, it shows better performance than $X^2$ based non-coherent receiver. But the template signal generally can't be ideal. A synchronization error between input signal and template signal, non-ideal template signal shape and noise in the template signal break down the performance of a coherent receiver. However, the novel receiver of the embodiments of the invention doesn't use a template signal, and therefore doesn't suffer those problems. FIG. 10B shows that the performance of a coherent receiver is worse than that of the novel receiver according to a particular embodiment when there is a synchronization error between input signal and template signal. Template generation circuit design is not trivial. Usually it requires expensive high performance technology like BiCMOS or GaAs, and it consumes lots of power. Because the novel receiver of various embodiment doesn't need to generate a template signal, the design of some embodiments may be less expensive and easier-to-implement and further may make a low power design possible.

Figure 10C:
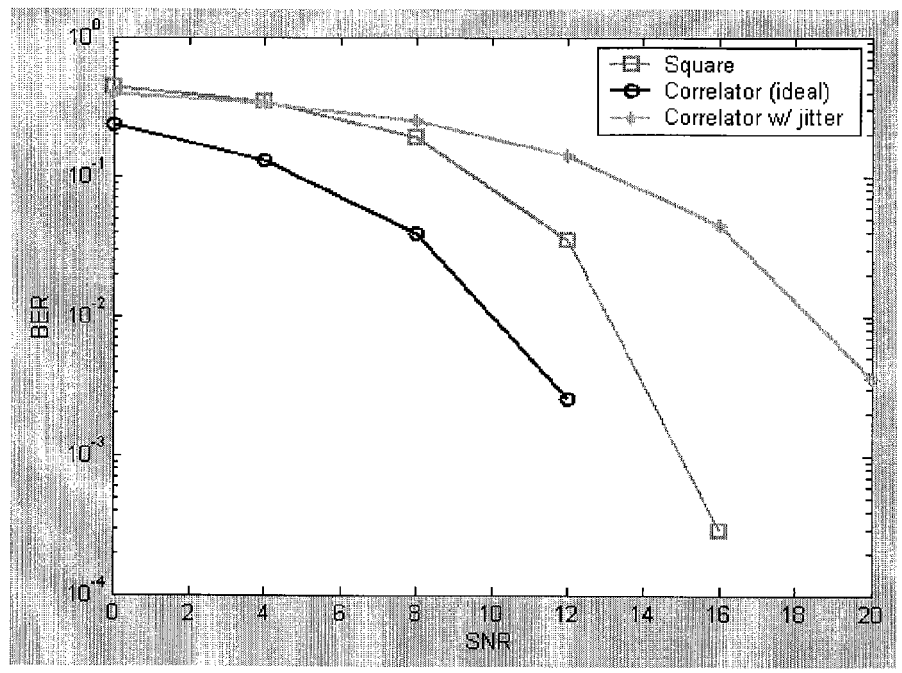

FIG. 10C compares the performance of a coherent detector and that of the novel $X^n$ block based non-coherent receiver ($X^2$ case) that has typical BPF and integration time (Tin=Tb/2) half of binary time (Tb) according to a particular embodiment. FIG. 10C shows that reducing the integration time improves the receiver performance further.

Figure 10D:
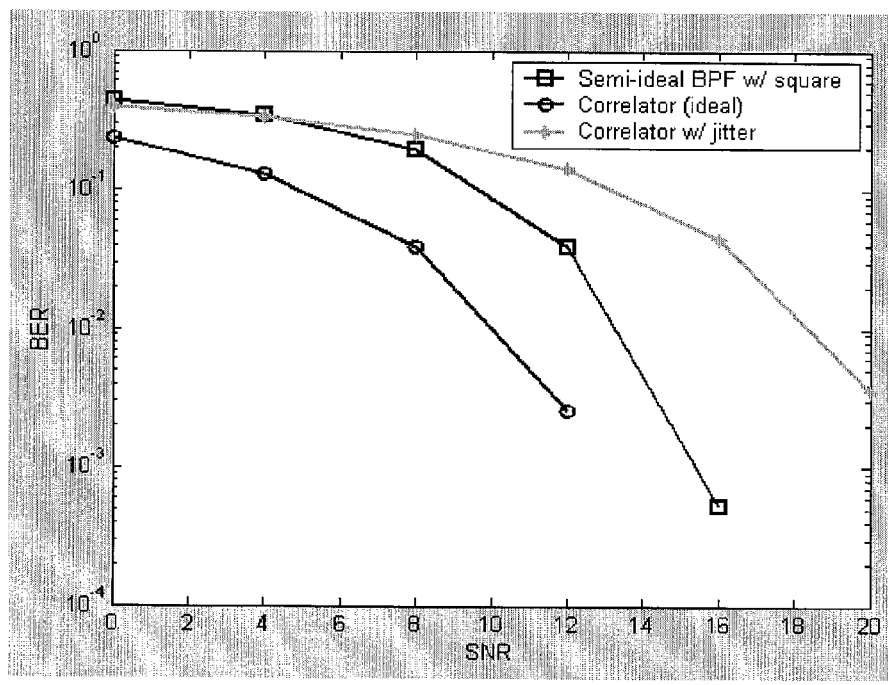

FIG. 10D compares the performance of a coherent detector and that of the novel $X^n$ block based non-coherent receiver ($X^2$ case) that has optimized BPF and integration time (Tin) equal to binary time (Tb) according to a particular embodiment. Making the magnitude response of a BPF close to the power spectrum density of incoming signal may optimize the BPF. FIG. 10D shows that using such and optimized BPF improves the receiver performance further.

Figure 11:
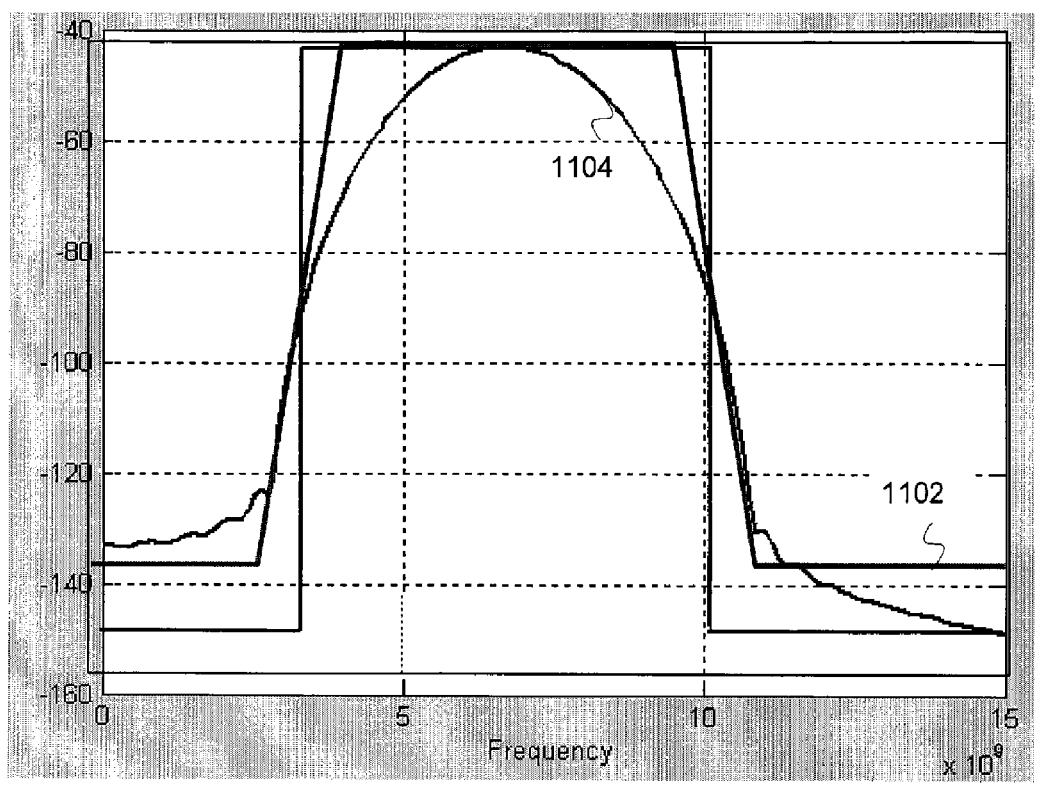
FIG. 11 shows the frequency domain transfer function of the BPFs used in the simulation and according to a particular embodiment.

FIG. 11 shows the frequency domain transfer function of the BPFs used in the simulation and according to a particular embodiment. The line 1102 is for a typical BPF 108 and the line 1 104 is for a BPF 108 that has same magnitude response with the incoming signals power spectrum density.

As will be appreciated from the above, the receiver including an $X^n$ device and integrator described above provides a method that does not require exact timing. Because the exact pulse position may not be known, the receiver of the various embodiments obtains the approximate peak based on the average by using the $X^n$ device and Integrator instead of sampling the signal at the exact peak. Thus some embodiments may provide for the elimination of the template signal generator and timing control blocks that consume a significant portion of the power used in conventional receivers. Further, in some embodiments, the degradation in performance is limited in comparison to a conventional coherent receiver that includes the effect of jitter.

The illustrations of embodiments described herein are intended to provide a general understanding of the structure of various embodiments, and they are not intended to serve as a complete description of all the elements and features of apparatus and systems that might make use of the structures described herein. The accompanying drawings that form a part hereof show by way of illustration, and not of limitation, specific embodiments in which the subject matter may be practiced.

Applications that may include the apparatus and systems of various embodiments broadly include a variety of electronic and computer systems. The elements, materials, geometries, dimensions, and sequence of operations can all be varied to suit particular packaging requirements.

Embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that any embodiment have more features than are expressly recited in a claim. Thus the following claims are hereby incorporated into the Detailed Description, with each claim standing on its own as a separate embodiment.

What is claimed is:

1. An ultra wideband receiver comprising:
   an antenna;
   a band pass filter coupled to the antenna to provide a filtered signal;
   a $X^n$ or $e^X$ block coupled to the filtered signal, wherein the $X^n$ block raises the filtered signal to an integer power (n) greater than one, and wherein the $e^X$ block raises a constant (e) to a power, the power having a value determined by the filtered signal;
   an integration and dump block coupled to the $X^n$ or $e^X$ block, wherein the integration and dump block has an integration time less than or equal to half a time period assigned to each data symbol; and
   a decision block coupled to the integration and dump block.

2. The ultra wideband receiver of claim 1, further comprising:
   a transmit/receive (T/R) switch coupled to the antenna and the band pass filter.

3. The ultra wideband receiver of claim 1, further comprising:
   an amplifier coupled to the band pass filter and the $X^n$ or $e^X$ block.

4. The ultra wideband receiver of claim 1, further comprising:
   a T/R switch coupled to the band pass filter and the $X^n$ or $e^X$ block.

5. The ultra wideband receiver of claim 1, further comprising:
   a T/R switch coupled to the band pass filter and an amplifier;
   wherein the amplifier is coupled to the T/R switch and the $X^n$ or $e^X$ block.

6. The ultra wideband receiver according to claim 1, wherein the band pass filter has a magnitude response close to a power spectrum density of an incoming signal.

7. The ultra wideband receiver according to claim 1, wherein the $X^n$ block comprises a multiplier that multiplies an input signal.

8. The ultra wideband receiver according to claim 1, wherein the $X^n$ block includes one or more multipliers.

9. An ultra wideband receiver comprising:
an antenna;
a band pass filter coupled to the antenna;
a rectifier or envelope detector coupled to the band pass filter to provide a rectified signal;
a $X^n$ or $e^X$ block coupled to rectified signal, wherein the $X^n$ block raises the rectified signal to an integer power (n) greater than one, and wherein the $e^X$ block raises a constant (e) to a power, the power having a value determined by the rectified signal;
an integration and dump block coupled to the $X^n$ or $e^X$ block, wherein the integration and dump block has an integration time less than or equal to half a time period assigned to each data symbol; and
a decision block coupled to the integration and dump block.

10. The ultra wideband receiver of claim 9, further comprising:
a T/R switch coupled to the antenna and the band pass filter.

11. The ultra wideband receiver of claim 9, further comprising:
an amplifier coupled to the band pass filter and the rectifier or envelope detector.

12. The ultra wideband receiver of claim 9, further comprising:
a T/R switch coupled to the band pass filter and the rectifier or envelope detector.

13. The ultra wideband receiver of claim 9, further comprising:
a T/R switch coupled to the band pass filter and an amplifier;
wherein the amplifier is coupled to the T/R switch and the rectifier or envelope detector.

14. The ultra wideband receiver according to claim 9, wherein the band pass filter has a magnitude response close to the power spectrum density of incoming signal.

15. The ultra wideband receiver according to claim 9, wherein the $X^n$ block comprises a multiplier that multiplies an input signal.

16. The ultra wideband receiver according to claim 9, wherein the $X^n$ block comprises one or more multipliers.

* * * * *